United States Patent
Good et al.

(10) Patent No.: US 6,938,060 B2
(45) Date of Patent: Aug. 30, 2005

(54) APPARATUS AND METHOD FOR GRAPHICALLY DISPLAYING A VECTOR SIMULTANEOUSLY ALONG WITH THE NUMERICAL VALUES OF ITS VECTOR COMPONENTS

(75) Inventors: John C. Good, Greenfield, NH (US); Shawn Prestridge, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 646 days.

(21) Appl. No.: 10/035,113

(22) Filed: Dec. 27, 2001

(65) Prior Publication Data

US 2003/0126166 A1 Jul. 3, 2003

(51) Int. Cl.[7] .................................................. G06F 3/02
(52) U.S. Cl. ......................................................... 708/160
(58) Field of Search ................................. 708/160–162, 708/174, 441; 712/222

(56) References Cited

U.S. PATENT DOCUMENTS

| | | | | |
|---|---|---|---|---|
| 4,496,944 A | * | 1/1985 | Collmeyer et al. | 345/27 |
| 4,955,063 A | * | 9/1990 | Pierce | 382/168 |
| 5,199,103 A | * | 3/1993 | Smith et al. | 345/440 |
| 5,606,653 A | * | 2/1997 | Gilmore, Jr. | 345/440 |
| 5,870,319 A | * | 2/1999 | Thornton et al. | 708/160 |
| 6,219,682 B1 | * | 4/2001 | Terashima et al. | 708/205 |

* cited by examiner

Primary Examiner—D. H. Malzahn
(74) Attorney, Agent, or Firm—J. Dennis Moore; W. James Brady, III; Frederick J. Telecky, Jr.

(57) ABSTRACT

A handheld computing device (40) comprises a software application adapted to provide instructions to graphically display a vector on a display screen (48) simultaneously along with the numerical values for components of the vector. The software application may be further adapted to provide instructions to perform a vector math operation on one or more vectors, to allow a user to pick the vector for use in the vector math operation, concurrently while graphically viewing the vector on the display screen (48) simultaneously with its numerical values for components, and/or to allow a user to graphically input the vector by incrementing a vector component with an arrow key (101–104) on the input device (50), concurrently while graphically viewing the vector and vector changes on the display screen (48).

3 Claims, 10 Drawing Sheets

APPARATUS AND METHOD FOR GRAPHICALLY DISPLAYING A VECTOR SIMULTANEOUSLY ALONG WITH THE NUMERICAL VALUES OF ITS VECTOR COMPONENTS

FIELD OF THE INVENTION

The present invention generally relates to handheld computing devices and more specifically to an apparatus and method for graphically displaying a vector simultaneously along with numerical values of its vector components.

BACKGROUND OF THE INVENTION

Some existing calculators, handheld computing devices, and handheld user interfaces have the ability to graphically display a vector and/or perform mathematical operations for vectors. However, such devices do not show the graphical vector display simultaneously with the numerical vector components (e.g., x and y, or r and θ). Also, such devices do not show the graphical vector display while performing or inputting a mathematical operation.

As an educational tool, it would be beneficial for a student learning about vectors to be able to see a graphical display of a vector simultaneously while its numerical vector components are being entered, as well as after the numerical components are entered. Hence, there is a need for a device that graphically displays a vector along with the numerical values of the vector components simultaneously.

It would also be beneficial for a student learning about mathematical operations involving vectors (e.g., addition of vector, cross product, dot product) to see a graphical display of each vector operand for a mathematical operation while entering the mathematical operation, as well as seeing a graphical display of the vector resulting from the mathematical operation simultaneously displayed with the numerical values for the resulting vector's components. Hence, there is also a need for device that graphically displays a vector along with the numerical values of the vector simultaneously, during and after inputting a mathematical vector operation.

Because vectors and mathematical operations for vectors are often more easily understood through visual or graphical examples, such a needed device would allow a student or user to input a variety of examples and learn, at least in part, by example. It would also be beneficial if a software application providing such features could be loaded into an existing scientific calculator or other handheld user interface device to enable it to become such a device. Thus, there is need for an education tool that will graphically display vectors along with their vector components at the same time on the same display screen, either via a software application adapted to execute on existing devices or via a new device incorporating such features.

BRIEF SUMMARY OF THE INVENTION

The problems and needs outlined above are addressed by the present invention. In accordance with one aspect of the present invention, a handheld computing device is provided, which comprises: an electrical circuit, a display screen, an input device, and a software application. The electrical circuit comprises a memory device electrically coupled to a processor. The display screen and the input device are each electrically coupled to the electrical circuit. The software application is stored in the memory device, and when executed by the processor, the software application is adapted to provide instructions to graphically display a vector on the display screen simultaneously along with the numerical values for components of the vector. The handheld computing device may be a calculator with a display screen comprising a liquid crystal display device and an input device comprising a keypad, for example. The handheld computing device may be an electronic personal organizer. Such an electronic personal organizer may have a display screen comprising a touch sensitive screen, and the input device may comprise a simulated keypad displayed on the touch sensitive screen, such that a user can input a number or mathematical operator by contacting the touch sensitive screen, for example. The handheld computing device may be a cellular telephone and/or a pager, for example. The software application may be further adapted to provide instructions to perform a vector math operation on one or more vectors. The vector math operation may be a vector addition operation, a vector subtraction operation, a vector multiplication operation to provide a cross product, or a scalar multiplication operation to provide a dot product, for example. The software application may be further adapted to provide instructions to allow a user to pick the vector for use in the vector math operation, concurrently while graphically viewing the vector on the display screen simultaneously with its numerical values for components. The software application may be further adapted to provide instructions to allow a user to graphically input the vector by incrementing a vector component with a cursor key on the input device, concurrently while graphically viewing the vector and vector changes on the display screen. The software application may be further adapted to provide instructions to allow a user to numerically input a vector component with the input device, concurrently while graphically viewing the vector on the display screen. The memory device may comprise a flash memory device or a synchronous dynamic access memory (SDRAM) device, for example. The input device may comprise at least one soft key shown on the display screen corresponding to a button a keypad.

In accordance with another aspect of the present invention, a handheld computing device is provided, which comprises a software application stored in a memory device, and when executed by a processor, the software application being adapted to provide instructions to: perform a vector math operation on one or more vectors; and graphically display an answer vector resulting from the vector math operation on the display screen simultaneously along with numerical values for at least one vector component of the answer vector.

In accordance with yet another aspect of the present invention, a computer program adapted to be executed on a handheld computing device is provided. When executed on the handheld computing device, the computer program is adapted to provide instructions to graphically display a vector on a display screen of the handheld computing device simultaneously with the numerical values for at least one component of the vector. The computer program may be further adapted to provide instructions to perform a vector math operation on one or more vectors. The computer program may be further adapted to provide instructions to allow a user to graphically input the vector by incrementing one or more of the at least one vector components with a cursor key on an input device of the handheld computing device, concurrently while graphically viewing the vector and vector changes on the display screen. The at least one component may comprise an X, Y, and/or Z component of the vector corresponding to an X, Y, and/or Z axis, respectively, of a Cartesian coordinate system. The at least one component may comprise a radial component and/or an angle component of the vector corresponding to a radial axis and/or an angle orientation, respectively, of a polar coordinate system.

BRIEF DESCRIPTION OF THE DRAWINGS

Other objects and advantages of the invention will become apparent upon reading the following detailed description and upon referencing the accompanying drawings, in which.

DETAILED DESCRIPTION OF THE INVENTION

Figure 1:
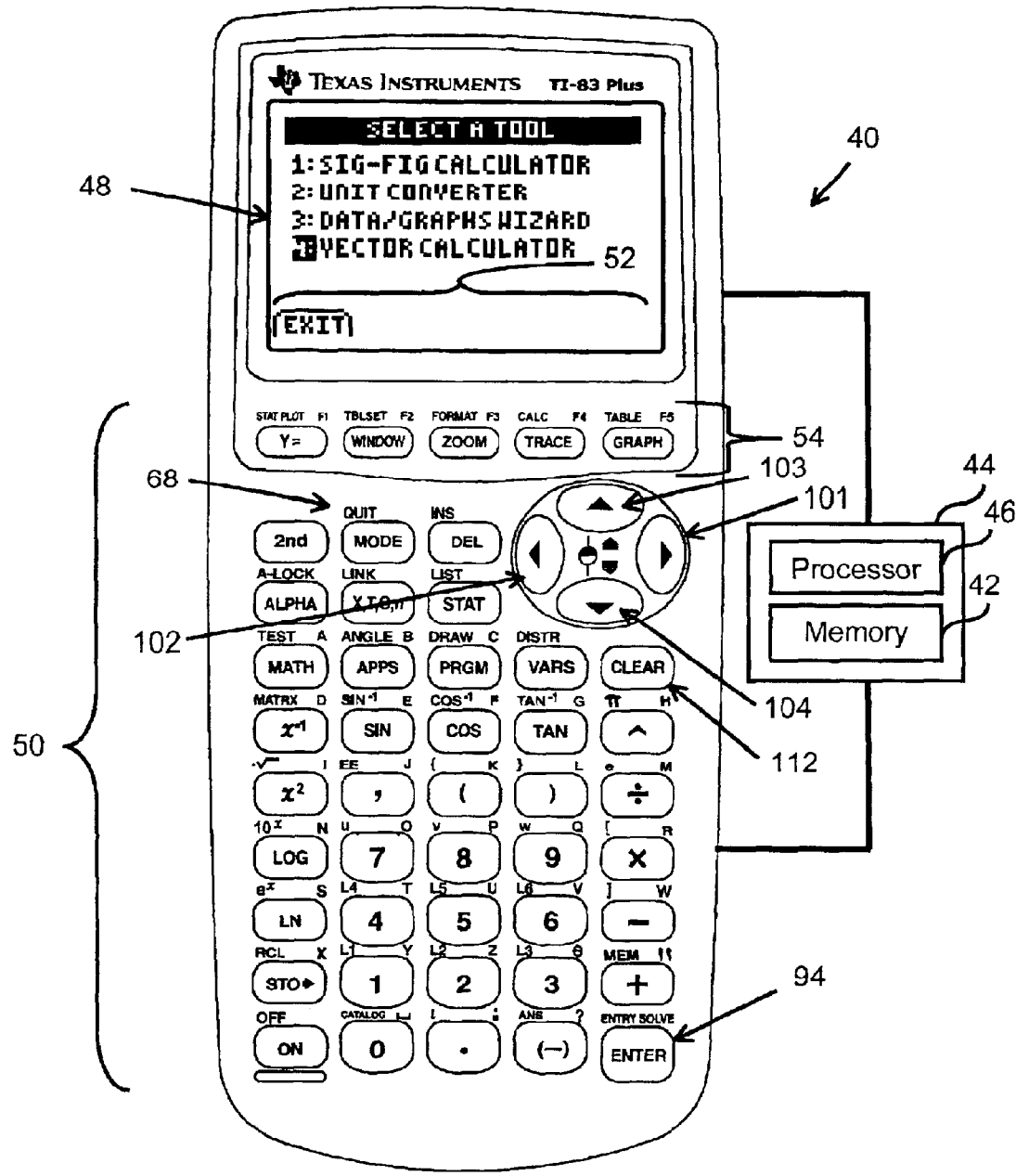
FIG. 1 is a drawing of a calculator in accordance with a preferred embodiment of the present invention.

Referring now to the drawings, wherein like reference numbers are used herein to designate like elements throughout the various views, a preferred embodiment of the present invention is illustrated and described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

An embodiment of the present invention provides a way to graphically display a vector on a display screen simultaneously along with the numerical values of its vector components. Such features may be incorporated into a new device and/or may be provided as a software application enabling an existing device to provide such features, for example.

The following description and FIGS. 1–38 pertain to a preferred embodiment of the present invention. FIG. 1 illustrates the preferred embodiment discussed herein, which is a portable, handheld calculator 40 having a software application loaded in its memory 42. In this example, the calculator 40 is a TI-83 Plus produced by Texas Instruments, Inc. However, an embodiment of the present invention may also be incorporated into a different model and/or a calculator made by another company. The preferred embodiment discussed herein is but one illustrative example of the use of the present invention and does not limit the scope of the invention to the preferred embodiment described. The present invention may be embodied in many different portable handheld computing devices. For example, an embodiment of the present invention may be a software application adapted to run on (but is not limited to) a programmable scientific calculator, a financial calculator, a graphical calculator, a palm-size computing device, an electronic planner, a cellular telephone, a pager, a portable handheld wireless email device, or other handheld electronic user interface devices.

Again, the calculator 40 of the preferred embodiment in FIG. 1 is just one example of a handheld computing device having a software application in accordance with the present invention. As is well known to those of ordinary skill in the art, a handheld computing device, such as a calculator, typically comprises (but is not limited to) an electrical circuit 44 having a processor 46 electrically coupled to a memory device 42, as well as a display screen 48 and an input device 50 electrically coupled to the electrical circuit 44. For illustration purposes, the electrical circuit 44 is shown schematically outside of the calculator 40, even though the electrical circuit 44 is actually within and a part of the calculator 40 in this example. A handheld computing device in accordance with an embodiment of the present invention also comprises at least one software application stored in the memory device 42 that is adapted to be executed by the processor 46. The memory device 42, processor 46, display screen 48, input device 50, and software application, each may vary for a given application. Consider the following examples illustrating some variations of these components for a variety of handheld computing devices, which are just a few examples and are not intended to limit the scope of a claimed invention herein.

The handheld computing device may be adapted to connect to a television (not shown), so that the television provides a display screen or a duplicate image of the display screen on the computing device, for example. The display screen may comprise an active matrix display device (not shown). Also, the display screen and the input device may be integral with one another. For example, if the display screen comprises a touch sensitive screen (not shown) that allows inputs to be received by touching the screen with a finger or a touch wand (not shown), the input device may be a simulated keypad displayed on the touch sensitive screen. Such displays are often used in portable palm-sized computer devices for example. If the handheld computing device is a cellular telephone, for example, the input device may include the key pad normally used for dialing telephone numbers.

A calculator 40, such as the one shown in FIG. 1, may be battery powered, solar powered, and/or powered by an AC/DC converter that can be plugged into an AC wall outlet. In FIG. 1, the display screen 48 of the calculator 40 has a liquid crystal display (LCD). The memory device 42 comprises a flash memory device, which stores the software application, among other tasks. The input device 50 comprises a keypad device with a variety of buttons. The input device also comprises "soft keys" 52, which correspond to buttons 54 whose function may change to suit a given software application. For example, in FIG. 7 five soft keys 52 are displayed on the screen 48. If the user presses a button 54 below the displayed soft key 52, it will provide the input displayed on the soft key 52. Hence in FIG. 7, if a user presses the button 54 below the MATH soft key 56, such button depression will be interpreted by the software application as the user's desire to switch to math mode, as discussed further below.

Figure 2:
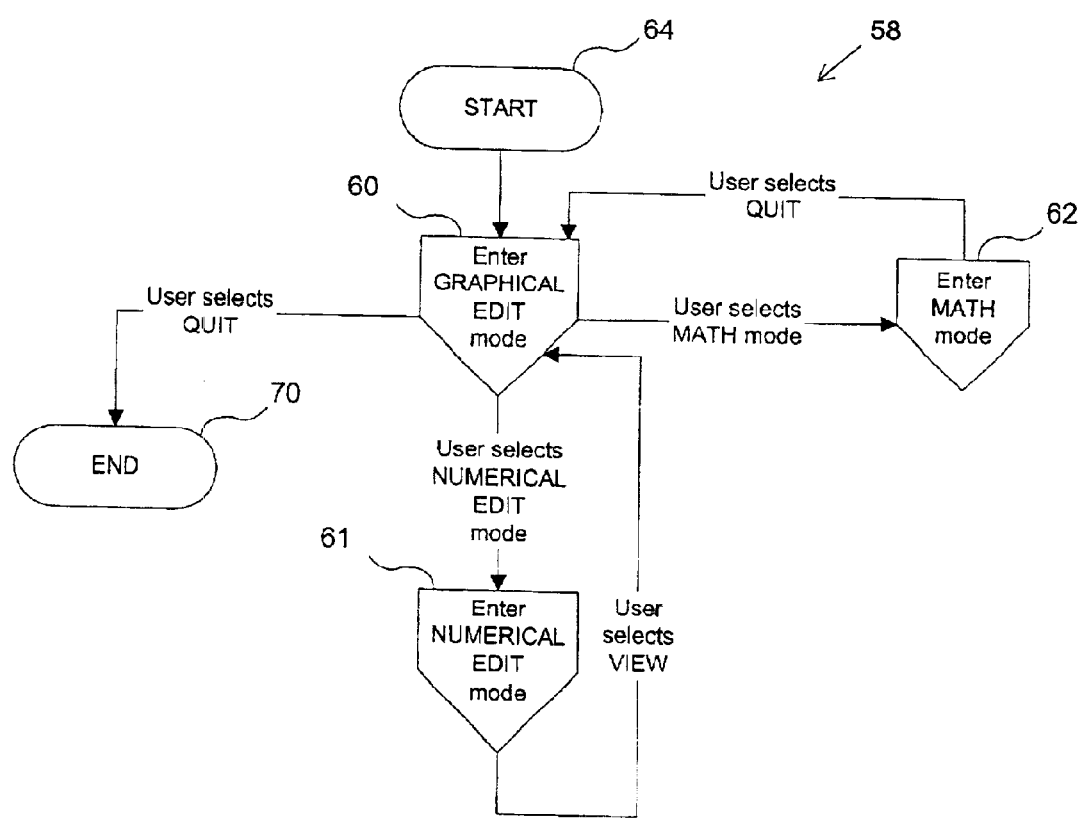
FIG. 2 is a flowchart showing a main process logic and instructions provided by a software application for the calculator of FIG. 1.

FIGS. 2–6 are pseudo code flowcharts illustrating the process logic and instructions provided by the software application for the preferred embodiment. The particular computer language used to implement the logic and instructions shown in FIGS. 2–6 may vary, depending on the programmer's preference and/or depending on the computing device of an embodiment. FIG. 2 illustrates the main process 58. FIGS. 3–6 illustrates subroutines 60–63 for various modes and functions called upon by the main process 58.

FIGS. 7–38 are screenshots from the calculator embodiment 40 of FIG. 1 having the software application described in the flowcharts 60–63 of FIGS. 2–6. The screenshots of FIGS. 7–38 illustrate the display 48 shown to a user while using the calculator 40 of the preferred embodiment for various example mathematical operations. Some of these screenshots will be referred to while describing the flowcharts 60–63 of FIGS. 2–6 as needed to illustrate an example display provided to the user at various stages of operation.

Figure 3:
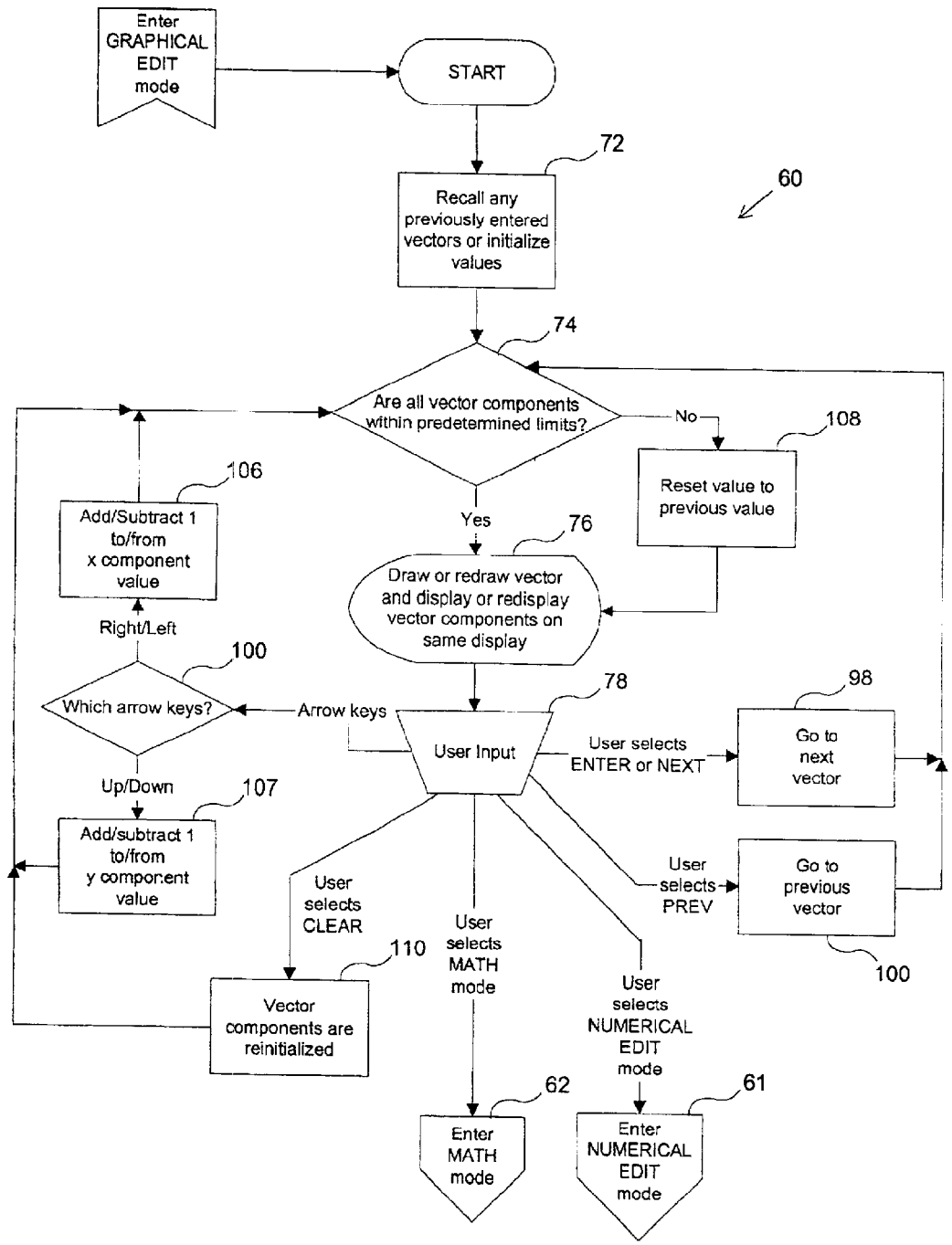
FIG. 3 is a flowchart showing a subroutine of the main process of FIG. 2 for providing a graphical edit mode.

Beginning in FIG. 2 at the start block 64 of the main process 58, the software initially enters a graphical edit mode (subprogram block 60) by default, and awaits further input by a user. The graphical edit mode subprogram 60 is illustrated in FIG. 3. If the user selects the numerical edit mode (subprogram block 61), then the main process 58 calls upon the subprogram illustrated in FIG. 4. If the user selects the math mode (subprogram block 62), then the main process 58 calls upon the subprogram illustrated in FIG. 5. If the user selects QUIT (button 68 on keypad 50 of calculator 40 in FIG. 1) while the main process 58 awaits an input from the user at block 60, then the main process is ended (end block 70). If in the math mode (subprogram block 62) and the user selects QUIT (button 68 on FIG. 1), then the main process 58 returns to the graphical edit mode (subprogram block 60). While in the numerical edit mode (subprogram block 61) if the user selects VIEW (e.g., VIEW see soft key 69 in FIG. 8), then the main process 58 again returns to the graphical edit mode (subprogram block 60). Although the graphical edit mode 60 is default in this embodiment, other of the modes may be the default mode for other embodiments.

Figure 7:
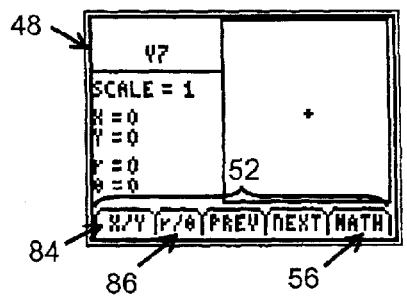
FIGS. 7–38 are screenshots from the calculator of FIG. 1 to illustrate some of the various uses of the preferred embodiment in accordance with the present invention.

Referring to FIG. 3, upon entering and starting the graphical edit mode, previously entered vectors (stored in memory) are recalled (action block 72). FIG. 7 is a screenshot showing vector V7, which has the initial values of zero for the vector components. As shown in FIG. 7 for vector V7, if there are no previously entered vector values for a given vector, then the values are initialized to zero (action block 72). Next, it is determined whether all vector components are within the predetermined limits (decision block 74). Because at the beginning of the graphical edit mode 60 the vector components will have already been entered or just initialized to zero, the vector components will likely be within the predetermined limits. For the preferred embodiment, the predetermined limits for the vector components are +10,000 and −10,000 for X and for Y. However, such predetermined limits may vary, and may be programmable in other embodiments. Because the current vector components are within the limits, the vector is now drawn or redrawn and displayed or redisplayed, simultaneously on the same display (action block 76), as shown in FIG. 7 for example. Next, the software application awaits a user input (input block 78).

Figure 4:
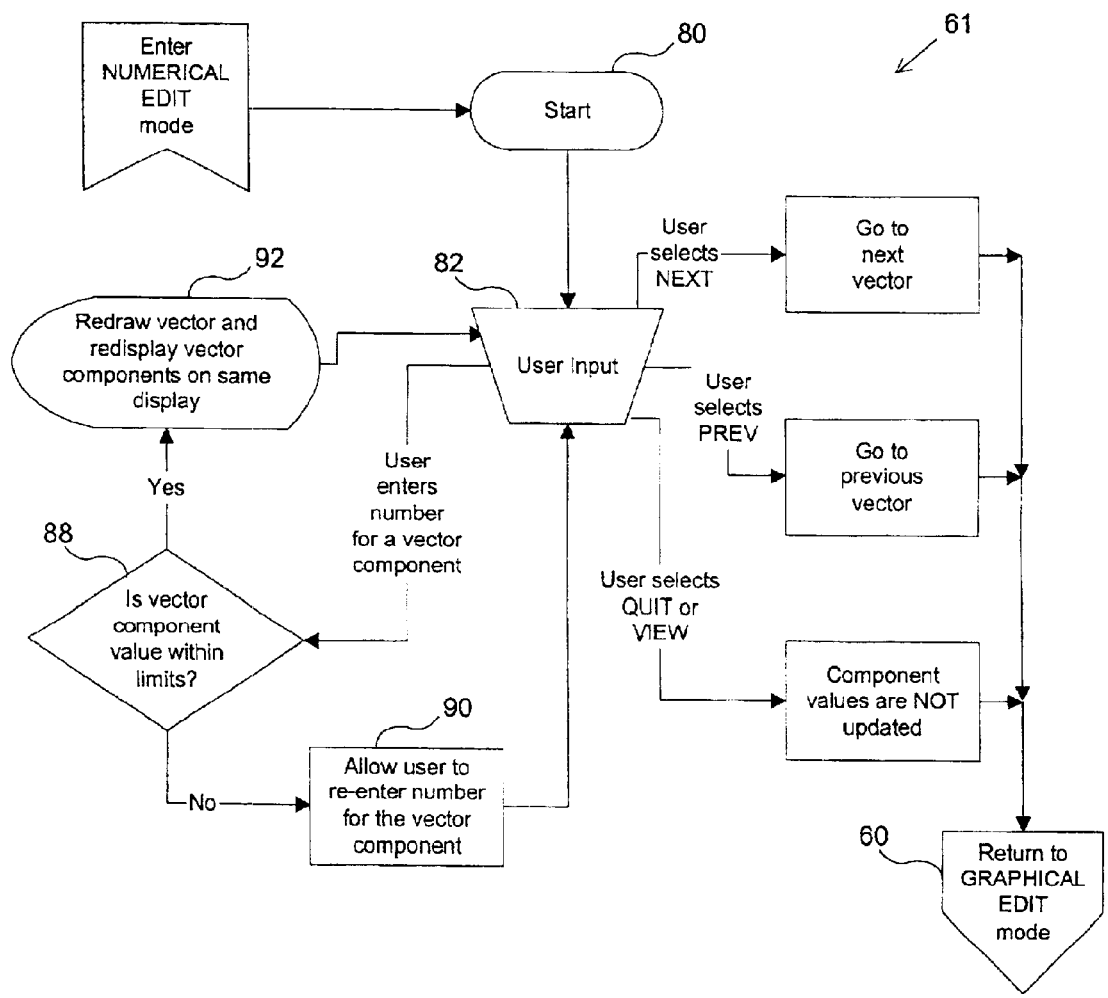
FIG. 4 is a flowchart showing a subroutine of the main process of FIG. 2 for providing a numerical edit mode.
Figure 5:
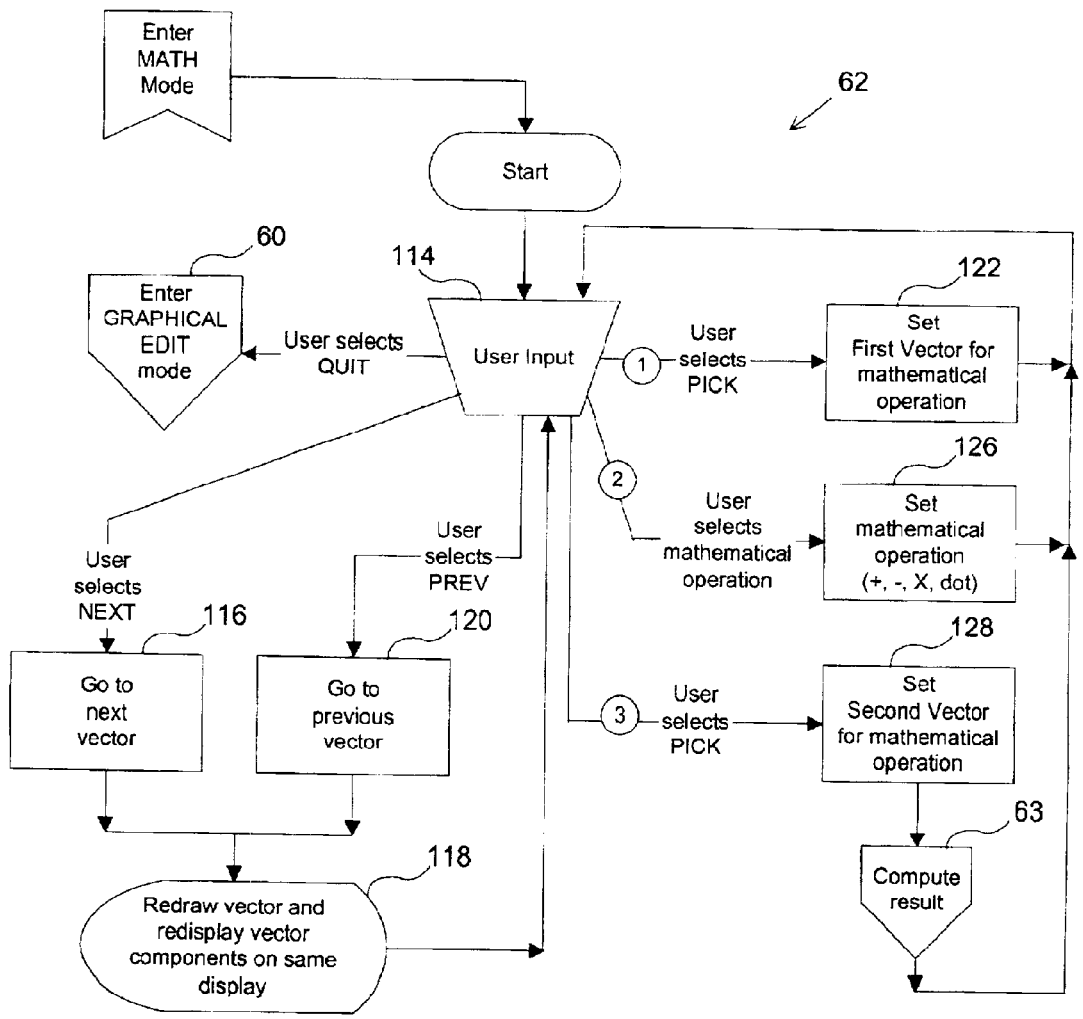
FIG. 5 is a flowchart showing a subroutine of the main process of FIG. 2 for providing a math mode.

Referring still to FIG. 3, if the user selects the numerical edit mode 61, then the subprogram 61 shown in FIG. 4 is begun at the start block 80. Again, the software application awaits a user input (input block 82). Typically at this point a user will be entering a numerical value for the current vector. In the preferred embodiment, the user may enter the vector components corresponding to a Cartesian coordinate system (i.e., X and Y), or the user may enter the vector components corresponding to a polar coordinate system (i.e., r and θ). As shown in FIG. 7 for example, there is an "X/Y" soft key 84 and a "r/θ" soft key 86 on the display screen 48. Pressing the "X/Y" soft key 84 directs the software application to switch to numerical edit mode 61 and allows the user to enter a numerical value for the X and/or Y vector components. Similarly, pressing the "r/θ" soft key 86 directs the software application to switch to numerical edit mode 61 and allows the user to enter a numerical value for the r and/or θ vector components.

Figure 16:
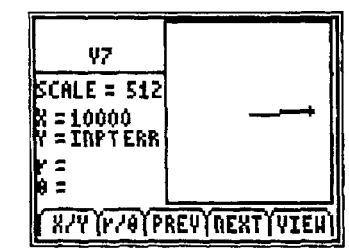
Figure 17:
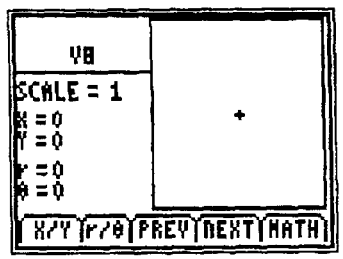
Figure 18:
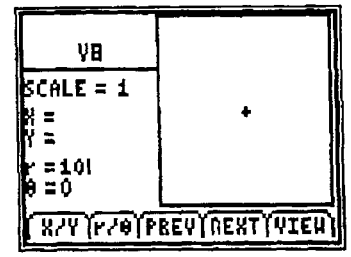

Referring again to the flowchart 61 of FIG. 4, if the user enters a number for a vector component (e.g., X, Y, r, or θ), it is determined whether the vector component value is within limits (decision block 88). Again, for the preferred embodiment the limits on the X, Y, and θ vector components are −10,000 and +10,000, and the limits on the r vector component correspond to the limits imposed on X and Y. Hence, the limit on r is 14,142.14, which corresponds to ±10,000 for X and Y. If the vector component entered is not within limits, the software application prompts the user to re-enter the number for the vector component (action block 90). In the preferred embodiment, an error message of "INTERR" is given and the user can re-enter the number, as shown in FIG. 16 for example. At this point the software program is again waiting for a user input (input block 82). If the vector component entered is within limits (decision block 88), the vector is redrawn on the display and the new vector components are displayed also on the same display (action block 92). After redrawing the vector and redisplaying the vector components, the software again waits for the next user input (input block 82).

Figure 8:
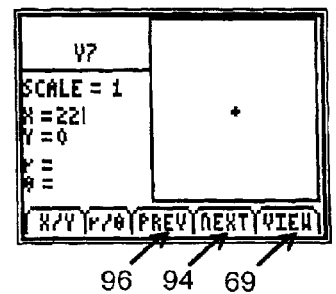

Still referring to the flowchart of FIG. 4, if the user selects QUIT 68 or VIEW 69 while inputting numbers (i.e. before the user presses ENTER 93, shown on FIG. 1, or before the user enters a number within the limits), the vector component values are not updated (i.e., the numbers input are discarded) and the software is returned to the graphical edit mode 60. The user can switch or jump to another vector (of the nine possible vectors in the preferred embodiment for example) by selecting NEXT or PREV. In the preferred embodiment, there is a NEXT soft key 94 and a PREV soft key 96, as shown in FIG. 8 for example. Thus in the flowchart 61 of FIG. 4, if the user selects NEXT 94 to go to the next vector or PREV 96 to go to the previous vector, the next or previous vector will be called up and the software returns to the graphical edit mode 60. In the graphical edit mode, as shown in the flowchart 60 of FIG. 3, the limits of the next or previous vector are recalled (action block 72), the vector components are checked to verify they are within the limits (decision block 74), the vector is redrawn (action block 76), the vector components are redisplayed (action block 76), and then the software again waits for the next user input (input block 78). Hence, at this point the next or previous vector is shown graphically on the display 48 simultaneously along with the values of its vector components.

In the flowchart 60 of FIG. 3, if the user selects NEXT 94 or PREV 96 in the graphical edit mode while waiting for the next user input (input block 78), the next or previous vector is called up (action blocks 98 and 100, respectively), its vector components are verified to be within the limits (decision block 74), the vector is redrawn on the display (action block 76), its vector components are redisplayed (action block 76), and then the software again waits for the next user input (input block 78). Hence, at this point the next or previous vector is shown graphically on the display simultaneously along with its vector components. If the user selects ENTER 93 in the graphical edit mode 60 while waiting for the next user input (input block 78), the next vector will be called up (action block 98), rechecked for being within the limits (decision block 74), redrawn (action block 76), and redisplayed (action block 76) as if the NEXT soft key 94 were pushed. The ENTER key 93 is on the keypad 50 in the preferred embodiment, as shown in FIG. 1, but it may be located elsewhere in other embodiments.

In the graphical edit mode (flowchart 60), if the user presses an arrow key 101–104, it is first determined which of the arrow keys was pressed (decision block 100). The arrow keys 101–104 in the preferred embodiment are on the keypad 50, as shown in FIG. 1. If the right or left arrow key 101 or 102 is pressed, one is added to (for right arrow 101) or subtracted from (for left arrow 102) the X vector component value (action block 106 or 107, respectively). Next, it is determined whether the X vector component is still within the predetermined limits after adding one or subtracting one (decision block 74). If adding one to or subtracting one from the X vector component is not within the limits (decision block 74), then the X vector component is reset to its previous value (i.e., the value of X before adding or subtracting one) (action block 108), the vector of the previous values is redrawn and the previous values of the vector components are redisplayed (action block 76). Next, the software again waits for a subsequent user input (input block 78). If adding one to or subtracting one from the X vector component is within the limits (decision block 74), then the vector is redraw on the display with the new X value and the vector component values are redisplayed with the new X value (action block 76). Next, the software again waits for a subsequent user input (input block 78). Similarly, if the user presses an up or down arrow key 103 or 104, one is added to (for up arrow 103) or subtracted from (for down arrow 104) the Y vector component value. The subsequent steps are the same as those described above for adding to or subtracting from the X vector (see flowchart 60 of FIG. 3).

In the graphical edit mode (flowchart 60), if the user selects CLEAR, the vector components for the currently shown vector are reinitialized to zero (action block 110). In the preferred embodiment, there is a CLEAR button 112 on the keypad 50 (see FIG. 1). The resulting display on the screen 48 will be like that of the screen shot shown in FIG. 7 for example where all vector components are zero.

Figure 27:
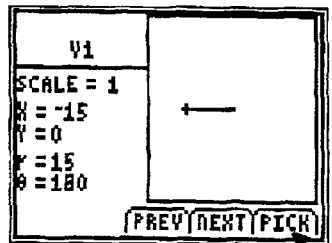

While in the graphical edit mode (flowchart 60 of FIG. 3), if the user selects math mode 62, the software calls up the math mode subprogram. The logic and instructions for the math mode in the preferred embodiment are illustrated in the flowchart 62 of FIG. 5. Upon entering the math mode 62, the display changes to update the soft keys 52 for the different functions of the math mode, as shown in FIG. 27 for example, and the software then waits for a user input 114 (see FIG. 5). If the user selects QUIT by pressing the QUIT button 68 (see FIG. 1), the software goes to graphical edit mode 60. The math mode 62 of the preferred embodiment has three stages of user input for performing a vector math operation for two vectors:

1. Selecting or picking the first vector for a mathematical operation;
2. Selecting the type of mathematical operation to perform; and
3. Selecting or picking the second vector for the mathematical operation.

Upon entering the math mode 62, the software assumes that the vectors that will be chosen for the vector math operation have already been entered via the numerical edit mode 61 and/or the graphical edit mode 60.

Before selecting or picking a first or second vector for a vector math operation, the user may want to or need to scroll to or go to another vector stored from prior input. In the preferred embodiment, nine vectors (V1–V9) can be stored. However, this number may vary for other embodiments. In the math mode 62, if the user selects NEXT (i.e., pressing the NEXT soft key 94), the software obtains from memory 42 the next vector (action block 116), it is redrawn on the display screen (action block 118), and its vector components are redisplayed on the same display (action block 118), both being displayed simultaneously. For example, if vector V3 is shown on the display screen 48 in the math mode 62 and the user selects NEXT 94, then the software pulls the next vector, which is vector V4 in this case, from memory 42, redraws vector V4 (action block 118), and redisplays the components of vector V4 (action block 118). Similarly, if the user selects PREV 96, the software obtains from memory 42 the previous vector (action block 120) and the previous vector is drawn and it vectors are displayed simultaneously on the display screen (action block 118). Next, the software again waits for the next user input (input block 114).

Figure 28:
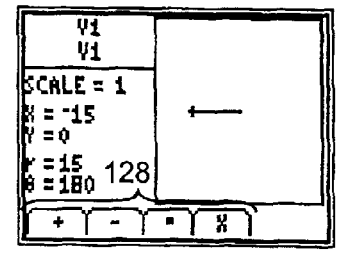

While still in math mode 62 (FIG. 5) and after having the desired or needed vector on the display screen 48, if the user selects PICK (stage 1), the first vector for the vector math operation is set (action block 122). In the preferred embodiment, a PICK soft key 124 is shown on the display screen 48 during stage 1 of the math mode, as shown in FIG. 27 for example. After setting the first vector (action block 122), the software progresses to stage 2 of the math mode 62 and the soft keys change accordingly, as shown in FIG. 28 for example. Then the software waits for the next user input (input block 114) in stage 2 of the math mode 62. Hence at this point (stage 2), the user may select QUIT 68 to exit math mode 62, select NEXT 94 to go to the next vector, select PREV 96 to go to the previous vector, or select the type of mathematical operation desired or needed for the current vector math operation. After having the desired or needed vector on the display screen 48, if the user selects a mathematical operation, the mathematical operation is set for the current vector math operation (action block 126), the math mode 62 progresses to stage 3, and the software awaits a subsequent user input (input block 114). In the preferred embodiment, the soft keys 128 in stage 2 of the math mode 62 provide four options for the type of mathematical operation performed: addition (+), subtraction (−), cross product (X), and dot product (·) (e.g., see soft keys 128 shown in FIG. 28). Stage 3 of the math mode 62 is much like stage 1, the software expects the user to go to and select the vector desired or needed for the second vector of the vector math operation. After having the desired or needed vector on the display screen 48, if the user selects PICK 124 (stage 3), the second vector for the vector math operation is set (action block 128). After setting the second vector (action block 128), the software then computes the result of the vector operation (subprogram block 63).

Figure 6:
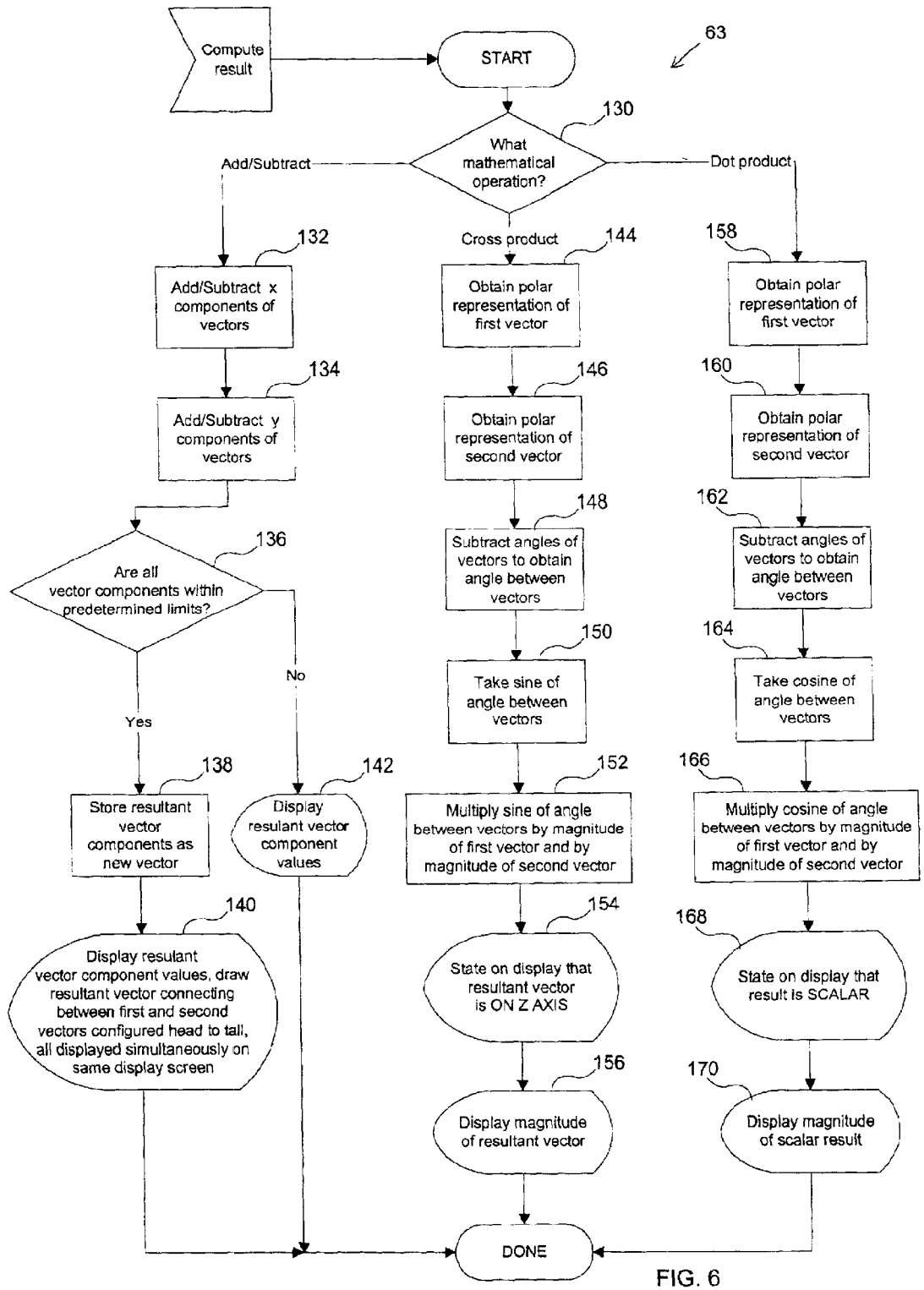
FIG. 6 is a flowchart showing a subroutine of the math mode of FIG. 5 for computing a result of a vector math operation.

The logic and instructions provided by the software application for computing the result of the vector math operation are illustrated in the flowchart 63 of FIG. 6. In the compute result subprogram 63, it is first determined what mathematical operation was selected and set in the math mode (decision block 130). If addition or subtraction was set for the type of mathematical operation, then the add/subtract sequence is performed. First, the X components of the first and second vectors picked previously in math mode are added to or subtracted from each other (action block 132). Then, the Y components of the first and second vectors picked previously in math mode are added to or subtracted from each other (action block 134). Note that these first two steps 132 and 134 may be done in parallel or in a reversed sequence. Next, it is determined whether the resulting X and Y components from the addition or subtraction operations are within the predetermined limits (e.g. between −10,000 and 10,000 for the preferred embodiment) (decision block 136). If the resultant vector components are within the limits (decision block 136), the vector components are stored as a new vector (action block 138). In the preferred embodiment, the resultant vector is stored as vector V9, and the software overwrites any previously stored values in vector V9. But in other embodiments, the storage parameters for the resulting vector may vary. Next, the resulting vector (e.g., V9) is drawn on the display screen connecting between the first and second vectors (action block 140), which are also displayed in a head-to-tail configuration, and the vector component values for the resultant vector are displayed simultaneously as well (action block 140) on the same display screen 48.

Figure 30:
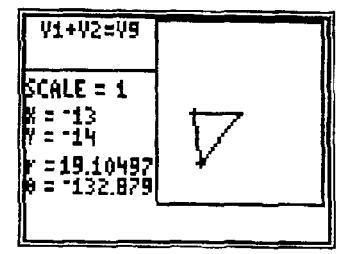
Figure 31:
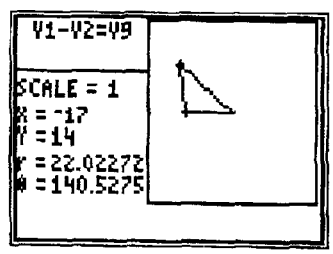

Examples of the resultant vector being drawn along with the first and second vectors of the addition/subtraction vector math operation are shown in FIGS. 30 and 31. An advantage to displaying the first and second vectors of the addition/subtraction vector math operation in a head-to-tail configuration is that it provides a valuable education tool to illustrate the concepts of vector addition or subtraction. Thus, using the preferred embodiment, a student may enter numerous examples in the calculator 40 and see the results graphically displayed. This may aid the student in learning about addition/subtraction vector math operations and/or verifying manually performed addition/subtraction vector math operations (e.g., for a homework assignment). Many concepts, such as vectors, are more easily understood visually through graphical presentations.

Referring again to FIG. 6, if the resultant vector components are not within the predetermined limits (decision block 136), the values of the resultant vector components are displayed (action block 142), but the resultant vector is not drawn graphically on the display screen and is not stored. However, in other embodiments, an out of limits resultant vector may be dealt with in another way (e.g., displaying an error message, accounting for the maximum possible addition result to allow it to be scaled and drawn). But at least with the preferred embodiment, the values of the resultant vector are still shown (action block 142). Upon finishing the add/subtract sequence, the software returns to the math mode (flowchart 62 of FIG. 5) and awaits the next user input in math mode (input block 114 in FIG. 5).

Figure 37:
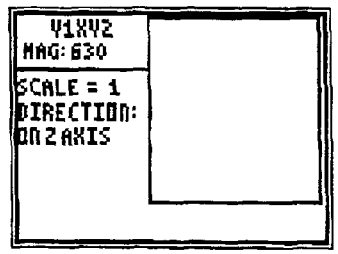

Referring back to the compute result flowchart 63 of FIG. 6, if cross product was set for the type of mathematical operation, then the cross product sequence is performed. First, the polar representation (i.e., polar coordinates r and θ) of the first and second vectors are obtained from memory (action blocks 144 and 146) (sequentially or in parallel). Next, the angular components (θ) are subtracted to obtain the angle between the first and second vectors (action block 148). Then, the sine function is performed or taken on the angle between the vectors (action block 150), which is multiplied by the magnitude (r) of the first and second vectors (action block 152). In other words, the cross product sequence performs the cross product calculation between the two two-dimensional vectors, which equals sin (θ)AB, where θ is the angle between the vectors, A is the magnitude of one vector, and B is the magnitude of the other vector. The cross product of a vector in the X-Y plane with another vector in the same X-Y plane results in a vector on the Z axis of a Cartesian coordinate system. Continuing with the cross-product sequence in FIG. 6, the next steps are to state on the display screen that the resultant vector is on the Z axis (action block 154) and display the magnitude of the resultant vector on the same display screen simultaneously (action block 156), as shown in FIG. 37 for example. In another embodiment of the present invention (not shown), the resultant vector on the Z axis may be drawn graphically with an arrow head coming out of the screen, which is often illustrated in text books by a dot with a circle around it (not shown), or with an arrow tail going into the screen, which is often illustrated in text books by an X (not shown). Upon completion of the cross product sequence, the software returns to the math mode (flowchart 62 of FIG. 5) and awaits the next user input in math mode (input block 114).

Figure 38:
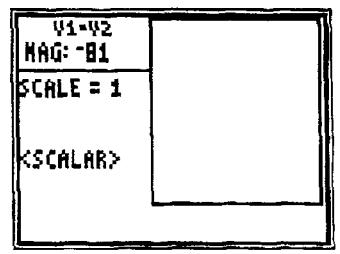

Referring yet again to the compute result flowchart of FIG. 6, if dot product was set for the type of mathematical operation, then the dot product sequence is performed. First, the polar representation (i.e., polar coordinates r and θ) of the first and second vectors are obtained from memory (action blocks 158 and 160) (sequentially or in parallel). Next, the angular components (θ) are subtracted to obtain the angle between the first and second vectors (action block 162). Then, the cosine function is performed or taken on the angle between the vectors (action block 164), which is multiplied by the magnitude (r) of the first and second vectors (action block 166). In other words, the dot product sequence performs the dot product calculation between the two two-dimensional vectors, which equals cos (θ)AB, where θ is the angle between the vectors, A is the magnitude of one vector, and B is the magnitude of the other vector. The result of the dot product is a scalar quantity. Hence, the next steps are to state on the display screen that the result is scalar (action block 168) and display the magnitude of the scalar result on the display screen (action block 170) simultaneously, as shown in FIG. 38 for example. Upon completion of the dot product sequence, the software again returns to the math mode (flowchart 62 of FIG. 5) and awaits the next user input in math mode (input block 114).

As will be apparent to one of ordinary skill in the art in light of this disclosure, the order of the steps illustrated in each of the flowcharts of FIGS. 2–6 may vary, may be done in parallel for some sequences, or may become integrated in a variety of equivalent ways to perform the same core functions to achieve the same results for another embodiment of the present invention without departing from the scope of the invention defined by the claims that follow this detailed description.

Next the screenshots in FIGS. 7–38 will be described. The following examples provided by the screenshots in FIGS. 7–38 will briefly describe the actions of a user and the results provided by the calculator embodiment 40 to illustrate some uses of the preferred embodiment. The detailed steps described above for the flowcharts 60–63 of FIGS. 2–6 correspond to the instructions and logic provided by the software application and performed by the processor 46 within the calculator 40 to provide the displayed results on the screen 48.

Figure 9:
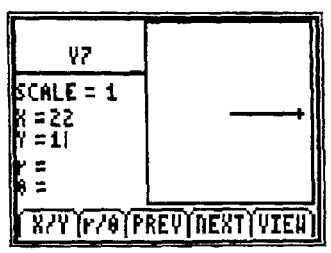

FIG. 7 shows a screenshot where the vector V7 has the initial values of zero for its vector components. If the user presses the X/Y soft key 84 shown in FIG. 7, the software application switches to the numerical edit mode 61, which provides a blinking cursor immediately after "X=" on the display 48. If the user inputs the numerical value 22 via the keypad, for example, "22" appears on the screen 48 followed by the blinking cursor, as captured in FIG. 8. If the users then presses ENTER 93 or the down arrow 104 on the keypad 50, the entered number (22) is evaluated by the software to make sure the value is within the predetermined limits (between −10,000 and +10,000). Because the value of 22 is within the limits for the calculator 40, the value of 22 is retained (stored in memory 42) for the X component and the vector is drawn on the display screen 48, as shown in FIG. 9. The cursor now blinks immediately after "Y=" on the display screen 48. Hence, at this point the software expects and waits for the user to enter a value for the Y component. If the user inputs the numerical value 1 via the keypad, for example, "1" appears on the display followed by the cursor, as captured in FIG. 9. In FIG. 9, the vector for X=22 and Y=1 is not drawn yet because the user has not pressed ENTER 93 or selected VIEW 69 yet. Thus the vector X=22 and Y=0 is still shown in FIG. 9. Upon selecting the VIEW soft key 69, the new Y value is evaluated to determine whether it is within the limits, which it is in this case. Then, the vector is redraw with the new Y value, the r and θ vector components are computed using the X and Y vector components, and the soft keys are changed, as captured in FIG. 10.

Figure 10:
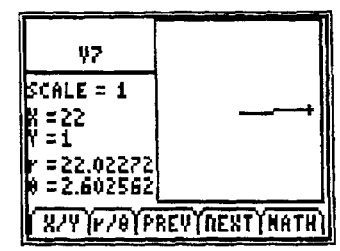
Figure 11:
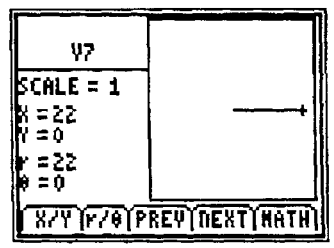

Still referring to FIG. 10, at this point the software has switched back to graphical edit mode by default. If the user now presses the down arrow button 104 on the keypad 50 (see FIG. 1), the value of Y will be decreased by one, the new Y value is evaluated to make sure it is within the limits. Because the new Y value is within limits, the new Y value is then stored in memory 42, the new Y value is displayed, and the vector is redrawn. Hence, at this point the vector V7 now has the vector components of X=22 and Y=0, as captured in FIG. 11. Referring back to FIG. 10 again, if the user had pressed the up arrow button 103 on the keypad 50 instead, the Y value would have been incremented or increased by one. Similar to the process steps for pressing the down arrow button 104, the new Y value is evaluated and displayed, and the vector is redrawn, as captured in FIG. 12.

Figure 12:
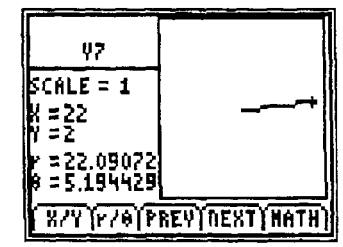
Figure 13:
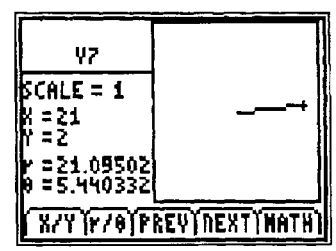
Figure 14:
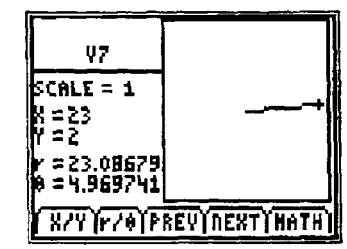
Figure 15:
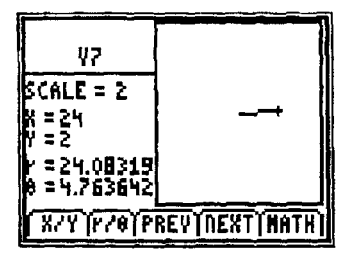

Referring to FIG. 12, if the user now presses the left arrow button 102 (see FIG. 1), the X value is decreased by one, evaluated, and redisplayed. Then, the vector is redrawn, as captured in FIG. 13. Likewise from FIG. 12, if the user presses the right arrow button 101, the X value is increased by one, which results in the screen captured in FIG. 14. Note in FIGS. 10–14 that each time the X or Y vector components are changed, the corresponding r and θ vector components are recomputed and redisplayed as well. Also note that the scale of the vector drawings in FIGS. 10–14 is one (i.e., vector displayed with one pixel per unit value). If the user further increments by one the X value of vector V7 in FIG. 14 by pressing the right arrow button 101 again, the new value of X becomes 24 and the scale changes to two, as shown in FIG. 15. The software automatically adjusts the scale as needed to proportionally draw the vector as best as it can given the limited resolution of the calculator display screen 48.

As noted above, the limits for the X and Y vector components in the preferred embodiment are each ±10,000. Referring to FIG. 15, if the user enters an X value of 10,000 using the numerical edit mode for example, the resulting vector drawn on the display screen is scaled to the maximum amount for the preferred embodiment of 512, as shown in FIG. 16. Thus, the vector shown in FIG. 16 has the vector components of X=10,000 and Y=2. If the user then attempts to enter a value for the Y component greater than 10,000, such as 10,001 or 15,000, then the error message of "Y=INTERR" is displayed, the attempted new Y component value is not accepted by the software, and the vector is not redraw, as captured in the screen shot shown in FIG. 16. The software application will then provide the user an opportunity to re-input a value for the Y component within the range of limits, and the software waits for the user's next input with the cursor blinking immediately after "Y=" on the display.

Figure 19:
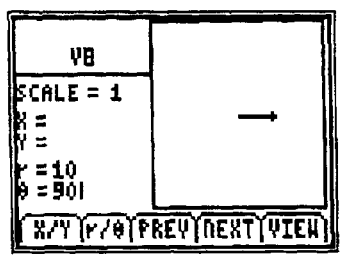
Figure 20:
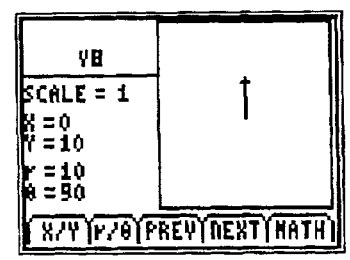

Referring again to FIG. 15, assuming the user is finished inputting the vector V7 and the user desires or needs to input values for another vector, the user can select the NEXT soft key 94 to go to the next vector, which is vector V8. Also assuming that vector V8 has only the initial values of zero, the user will be presented with a display as shown in the screen shot of FIG. 17. Now assuming the user desires or needs to input the values to define vector V8 in polar coordinates, the user can select the r/θ soft key 86 to enter the numerical edit mode for polar coordinates. At this point the cursor will blink immediately after "r=" on the display. If the user inputs the value 10 for example on keypad 50, the display will then appear as in the screen shot shown in FIG. 18 with the cursor blinking immediately after "r=10" on the display. After inputting the value of 10 for r, if the user then presses the down arrow key 104 on the keypad 50, the cursor will then blink immediately after "θ=" and the software will expect and await the user to input a value for θ. At this point because the initial value of θ is zero by default, the vector is drawn on the display as r=10 and θ=0 (degrees), as shown in FIG. 19. If the user inputs the value of 90 for θ for example, as shown in FIG. 19, and then selects the VIEW soft key 69, the vector will be redrawn with the new θ value, the X and Y vector components will be recomputed based on the r and θ values, and all of this will be displayed simultaneously on the same display screen 48, as shown in FIG. 20. Hence in the preferred embodiment, an angle (θ) of 90 degrees in the polar coordinates corresponds to an X value of zero in the Cartesian coordinate system, as is the common convention. However, in other embodiments, a different relationship between the Cartesian coordinate system and the polar coordinate system may be arbitrarily assigned.

Figure 21:
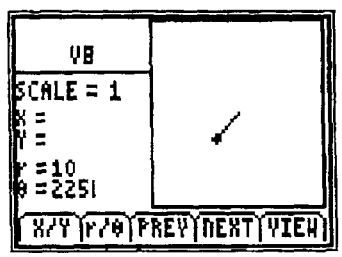
Figure 22:
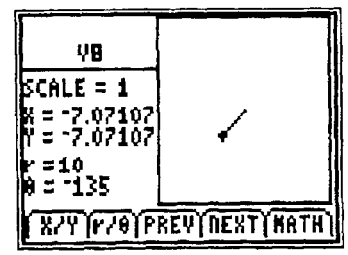
Figure 23:
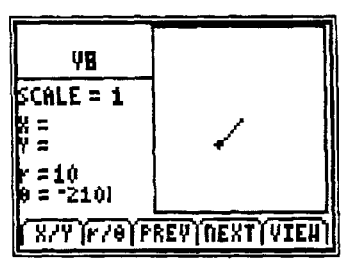
Figure 24:
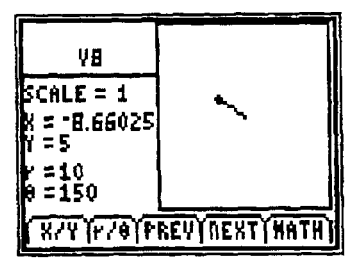

In the preferred embodiment, angles (θ) for the two top quadrants (i.e., Y≧0) are displayed numerically between 0 and 180 degrees, and angles for the two bottom quadrants (i.e., Y<0) are displayed numerically between –1 and –179 degrees. Hence, if a user inputs an angle of 225 degrees, as shown in FIG. 21 and upon entry of this value, the software application will automatically convert the angle to a value of –135 degrees, as shown in FIG. 22. Likewise, if a user were to input a value of –495, 585, 945, or 1305 degrees, the software will automatically convert the angle to a value of –135 degrees upon entry. Similarly for the top two quadrants, if a user inputs an angle value of –210 degrees for example, as shown in FIG. 23, the software will automatically convert the angle to a value of 150 degrees upon entry, as shown in FIG. 24. However, such display parameters for the numerical value of θ may vary for other embodiments.

Figure 25:
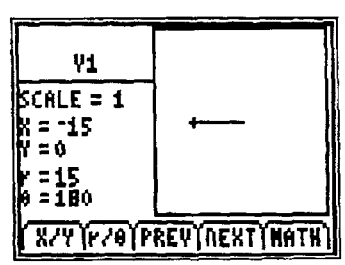
Figure 26:
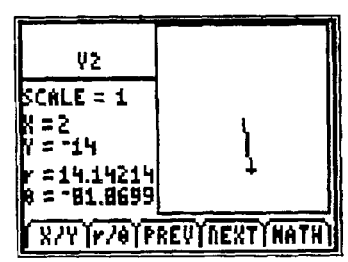
Figure 29:
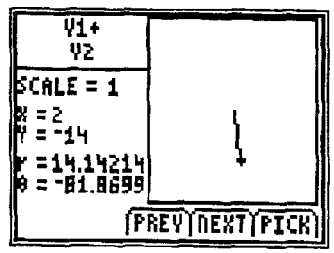

Next, screen shots of example vector math operations using the preferred embodiment will be described with reference to FIGS. 25–38. To perform a vector math operation with the preferred embodiment, the vectors that will be used in the vector math operation (other than initial values) must be entered first using the graphical edit mode and/or the numerical edit mode, as described above regarding FIGS. 7–24. For the first example, the vectors V1 and V2 will be used, which are shown in FIGS. 25 and 26, respectively. Upon selecting the MATH soft key 56 (see FIG. 25 or 26), the soft keys will change as the software application enters stage 1 of the math mode, as shown in FIG. 27. If desired or needed, the user may go to another vector (of the nine stored vectors V1–V9) by selecting the PREV soft key 96 or NEXT soft key 94 (see FIG. 27). If the user selects the PICK soft key 124 while vector V1 is displayed for example, as in FIG. 27, the software sets vector V1 as the first vector for the vector math operation. The software application then enters stage 2 of the math mode, the soft keys change accordingly, and "V1" is displayed at the top of the screen to indicate that it is set as the first vector for vector math operation, as shown in FIG. 28. The software now anticipates and waits for the user to select the type of vector math operation desired or needed. If the user chooses addition by selecting the +soft key for example, the software sets the vector math operation type to addition. The software then enters stage 3 of the math mode, the soft keys change accordingly, and "V1+" is displayed at the top of the screen to indicate the selection, as shown in FIG. 29. At this point the user needs to go to the vector (of vectors V1–V9) that is desired or needed for the second vector of the math operation. In this example the user goes to vector V2, for example, as shown in FIG. 29. Upon pressing the PICK soft key 124 (see FIG. 29), the second vector for the math operation is set to vector V2 and the software computes the result of the vector math operation. Then, the display screen 48 is updated with the results of the vector math operation, as shown in FIG. 30. Because the vector math operation was a vector addition, the software application of the preferred embodiment draws the first vector (V1 in this case) along with the second vector (V2 in this case) in a head-to-tail configuration with the resultant vector (stored as vector V9 by default) drawn connecting therebetween, as shown in FIG. 30. Although not shown here, the user may view vector V9, which is where the resultant vector is stored, alone (i.e., without vectors V1 and V2) by exiting the math mode and going to vector V9 (i.e., by selecting the PREV or NEXT soft key 94 or 96 until vector V9 is shown).

Referring back to FIG. 28, if the user had selected the—soft key to choose a subtraction math operation, and then again selected or picked vector V2 as the second vector, the resulting display would be that shown in FIG. 31. Because the vector math operation was a vector subtraction the software application of the preferred embodiment draws the first vector (V1 in this case) along with the second vector (V2 in this case) in a head-to-tail configuration with the resultant vector (vector V9) drawn connecting therebetween, as shown in FIG. 31.

Figure 32:
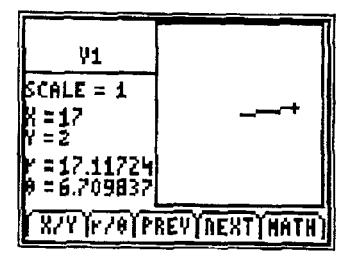
Figure 33:
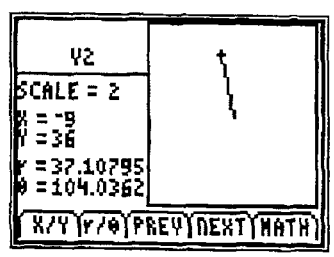
Figure 34:
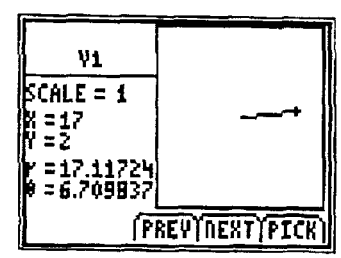
Figure 35:
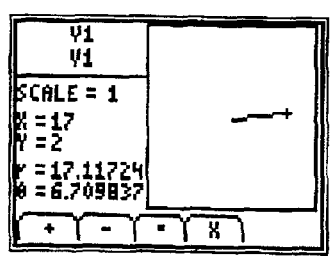
Figure 36:
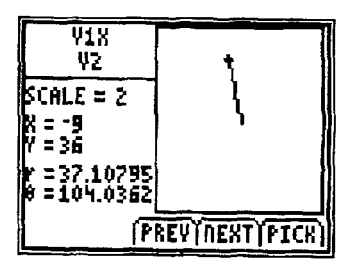

For the next two example vector math operations, the vectors V1 and V2 shown in FIGS. 32 and 33, respectively, are used. Upon entering the math mode (by selecting the MATH soft key 56), the soft keys change accordingly and stage 1 of the math mode begins, as shown in FIG. 34. If the user picks vector V1 for the first vector (by selecting the PICK soft key 124 while vector V1 is on screen as in FIG. 34), the soft keys again change as the software enters stage 2 of the math mode and awaits the user's choice for the type of math operation desired or needed, as shown in FIG. 35. If the user selects the X soft key, the vector math operation type is set to cross product, "V1 X" is displayed at the top of the screen, and the soft keys change accordingly as the software enters stage 3 of the math mode, as shown in FIG. 36. If the user selects or picks vector V2 as the second vector for the vector math operation, the software then computes the result, displays the magnitude of the resultant vector ("MAG: 630" in FIG. 37), and states on the display that the resultant vector lies on the Z axis, as shown in FIG. 37. In the preferred embodiment, the resultant vector of a cross product is not drawn because the Z axis extends into and out of the display screen. However in another embodiment (not shown), as mentioned above, the resultant vector may be displayed as coming out of the display screen (i.e., positive Z value) with a dot surrounded by a circle to graphically represent an arrow head for the vector, or as going into the display screen (i.e., negative Z value) with an X to graphically represent an arrow tail for the vector.

Referring back to FIG. 35, if the user selects the · soft key to choose a dot product vector math operation and if the user again selects vector V2 (see FIG. 33) as the second vector for the math operation, the result will be displayed to the user on the screen 48 as it is shown in FIG. 38. Because the result of a dot product is a scalar, no vector is drawn (see FIG. 38). However in the preferred embodiment, the software application does provide instructions for the calculator to display the magnitude ("MAG: –81 "in FIG. 38) of the dot product result and to state that the result is scalar on the display ("<SCALAR>" in FIG. 38).

Although the preferred embodiment displays only two-dimensional vectors in the X-Y plane, other embodiments (not shown) may display other two-dimensional planes in addition or in alternative (e.g., Y-Z plane, X-Z plane). Also, another embodiment (not shown) of the present invention may be adapted to display vectors in three dimensions, such as allowing for X, Y, and Z vector components on a Cartesian coordinate system and/or allowing for r, $\theta$, and $\phi$ in spherical coordinates. As the display screens, memory, and processors improve, become smaller, and become less expensive for use in handheld computing devices, the capability to implement an embodiment showing three dimensions may become more economically feasible.

Also in another embodiment (not shown), a vector component may be incremented in a graphical edit mode by clicking on a button on the screen via a mouse or via a touch-screen display in addition to or in alternative to using the arrow keys 101–104. Furthermore in another embodiment (not shown), a vector may be changed or created graphically in a graphical edit mode by grabbing, dragging, or stretching a vector using a mouse or using a touch-screen display in addition to or in alternative to using the arrow keys 101–104.

Because the preferred embodiment of the present invention graphically displays a vector simultaneously as its numerical vector components are entered, it provides an advantage of being a useful educational tool that can teach, reassure, and/or remind the user about the concepts of vectors in a graphical manner. The preferred embodiment may be valuable as a self-teaching aid allowing a student or user to enter many examples and see the results immediately on screen. The preferred embodiment also may be valuable as a reminder for a person trying to refresh his/her memory regarding vectors or vector math operations.

It will be appreciated by those skilled in the art having the benefit of this disclosure that an embodiment of the present invention provides a way to graphically display a vector, and/or a resulting vector for a vector math operation, along with the numerical values of the vector's components. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A handheld computing device comprising:
   an electrical circuit comprising:
      a processor, and a memory device electrically coupled to the processor;

a display screen electrically coupled to the electrical circuit;

an input device electrically coupled to the electrical circuit; and a software application stored in the memory device, and when executed by the processor, the software application being adapted to:

provide instructions to graphically display a vector on the display screen simultaneously along with the numerical values for components of the vector, and provide instructions to allow a user to graphically input the vector by incrementing a vector component with a cursor key on the input device, concurrently while graphically viewing the vector and vector changes on the display screen.

2. A computer program adapted to be executed on a handheld computing device, and when executed on the handheld computing device, the computer program being adapted to:

provide instructions to graphically display a vector on a display screen of the handheld computing device simultaneously along with the numerical values for at least one component of the vector; and provide instructions to allow a user to graphically input the vector by incrementing one or more of the at least one vector components with a cursor key on an input device of the handheld computing device, concurrently while graphically viewing the vector and vector changes on the display screen.

3. A portable handheld calculator, comprising:

an electrical circuit comprising:

a processor, and a memory device electrically coupled to the processor;

a display screen electrically coupled to the electrical circuit;

an input device comprising a keypad, and the input device being electrically coupled to the electrical circuit; and a software application stored in the memory device, and when executed by the processor, the software application being adapted to provide instructions to:

graphically display a vector on the display screen simultaneously along with the numerical values for components of the vector;

perform a vector math operation on one or more vectors, and graphically display an answer vector resulting from the vector math operation on the display screen simultaneously along with numerical values for at least one vector component of the answer vector;

allow a user to graphically input a vector by incrementing one or more of its vector components with a cursor key of the input device, concurrently while viewing the vector and vector changes on the display screen; and allow a user to numerically input a vector component for a vector with the input device, concurrently while graphically viewing the vector on the display screen.

* * * * *